US009452372B2

United States Patent
Sadana

(10) Patent No.: US 9,452,372 B2
(45) Date of Patent: Sep. 27, 2016

(54) METHOD FOR PREPARING A POROUS FLUOROPOLYMER AND PREPARING AN ARTICLE OF SAME

(71) Applicant: Anil K. Sadana, Houston, TX (US)

(72) Inventor: Anil K. Sadana, Houston, TX (US)

(73) Assignee: BAKER HUGHES INCORPORATED, Houston, TX (US)

(*) Notice: Subject to any disclaimer, the term of this patent is extended or adjusted under 35 U.S.C. 154(b) by 792 days.

(21) Appl. No.: 13/654,726

(22) Filed: Oct. 18, 2012

(65) Prior Publication Data

US 2015/0202827 A1  Jul. 23, 2015

(51) Int. Cl.
| | |
|---|---|
| B27J 5/00 | (2006.01) |
| B01D 29/00 | (2006.01) |
| C08J 9/26 | (2006.01) |
| B29C 67/20 | (2006.01) |
| B01D 39/16 | (2006.01) |
| B29K 27/12 | (2006.01) |

(Continued)

(52) U.S. Cl.
CPC ....... *B01D 29/0095* (2013.01); *B01D 39/1692* (2013.01); *B29C 67/202* (2013.01); *C08J 9/26* (2013.01); *B29K 2027/12* (2013.01); *B29K 2105/0005* (2013.01); *B29K 2105/04* (2013.01); *C08J 2201/044* (2013.01); *C08J 2327/12* (2013.01)

(58) Field of Classification Search
CPC ............ B29C 67/202; B01D 29/0095; B01D 39/1692; C08J 9/26; C08J 2327/12; C08J 2201/044; B29K 2105/04; B29K 2105/0005; B29K 2027/12
See application file for complete search history.

(56) References Cited

U.S. PATENT DOCUMENTS

| | | | | |
|---|---|---|---|---|
| 2,819,209 A * | 1/1958 | Pall | ............ | B01D 39/1661 210/510.1 |
| 4,076,656 A * | 2/1978 | White | ............ | C08J 9/26 106/122 |

(Continued)

FOREIGN PATENT DOCUMENTS

| | | |
|---|---|---|
| CN | 102527263 A | 7/2012 |
| EP | 0059619 A1 | 9/1982 |
| EP | 0630432 B1 | 7/1999 |

OTHER PUBLICATIONS

Whitford, [online]; [retrieved on Nov. 19, 2012]; retrieved from the Internet http://www.whitfordww.com/pdf/literature/Design%20Guide%201-06%202.pdf, "The Whitford Engineering Design Guide," 44p.

(Continued)

*Primary Examiner* — Galen Hauth
(74) *Attorney, Agent, or Firm* — Cantor Colburn LLP

(57) ABSTRACT

A method for preparing a porous fluoropolymer precursor includes combining a fluoropolymer and a removable additive to form a composition, the removable additive having a thermal decomposition temperature greater than a sintering temperature of the fluoropolymer, compressing the composition to form a preform, and sintering the preform to form the porous fluoropolymer precursor. A method for preparing a porous fluoropolymer includes disposing the porous fluoropolymer precursor in a removing agent, contacting the removable additive with the removing agent, and removing, by the removing agent, the removable additive from the porous fluoropolymer precursor to form the porous fluoropolymer, wherein the porous fluoropolymer comprises a plurality of pores formed by removing the removable additive.

16 Claims, 2 Drawing Sheets

(51) Int. Cl.
*B29K 105/00* (2006.01)
*B29K 105/04* (2006.01)

(56) References Cited

U.S. PATENT DOCUMENTS

| | | | | |
|---|---|---|---|---|
| 4,849,285 A | * | 7/1989 | Dillon | C08K 3/32 428/330 |
| 5,098,625 A | | 3/1992 | Huang et al. | |
| 5,232,600 A | * | 8/1993 | Degen | B01D 19/0031 210/490 |
| 5,275,766 A | * | 1/1994 | Gadkaree | B01D 67/003 216/67 |
| 5,910,277 A | | 6/1999 | Ishino et al. | |
| 5,980,799 A | | 11/1999 | Martakos et al. | |
| 6,911,489 B2 | | 6/2005 | Baron et al. | |
| 2007/0132130 A1 | * | 6/2007 | Roberts | B29C 70/04 264/41 |
| 2011/0000262 A1 | | 1/2011 | Saitou et al. | |

OTHER PUBLICATIONS

International Preliminary Report on Patentability; International Application No. PCT/US2013/060078; International Filing Date: Sep. 17, 2013; Date of Mailing: Dec. 23, 2013; 8 pages.

International Search Report and Written Opinion; International Application No. PCT/US2013/060078; International Filing Date: Sep. 17, 2013; Date of Mailing: Dec. 23, 2013; 10 pages.

* cited by examiner

METHOD FOR PREPARING A POROUS FLUOROPOLYMER AND PREPARING AN ARTICLE OF SAME

BACKGROUND

Separation of homogeneous and heterogeneous fluids has proven to be a challenge. For example, homogeneous fluids, although a single phase, can contain a combination of different compounds. Of these compounds, only one or small number may be of interest, with the other compounds causing, for example, processing problems. Heterogeneous fluids can cause similar concerns. Implements for the separation of fluid components can be used to arrive at the compounds of interest. In particular, downhole completions are often used to produce or harvest fluids, e.g., hydrocarbons, from subterranean reservoirs, formations, or production zones. Undesirable fluids, e.g., water or brine, also are often located downhole. Moreover, such fluids can also contain particulates such as fines. As a result, flow control devices have been contemplated for limiting production of the undesirable fluids or particulates in order to maximize the yield of the desirable fluids. Although useful for impeding some amount of water or other undesirable fluid flow or particles, current flow control devices only partially eliminate the flow of undesirable fluids or particles. Accordingly, advances in flow control materials, devices, and other systems and methods for limiting undesirable fluid flow or particles into a downhole production assembly are well received by the industry.

BRIEF DESCRIPTION

The above and other deficiencies of the prior art are overcome by, in an embodiment, a method for preparing a porous fluoropolymer precursor comprises: combining a fluoropolymer and a removable additive to form a composition, the removable additive having a thermal decomposition temperature greater than a sintering temperature of the fluoropolymer; compressing the composition to form a preform; and sintering the preform to form the porous fluoropolymer precursor.

In another embodiment, a method for preparing a porous fluoropolymer comprises: disposing the porous fluoropolymer precursor in a removing agent; contacting the removable additive with the removing agent; and removing, by the removing agent, the removable additive from the porous fluoropolymer precursor to form the porous fluoropolymer, wherein the porous fluoropolymer comprises a plurality of pores formed by removing the removable additive.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
FIG. 1 shows a picture of a porous polytetrafluoroethylene cylinder.

A detailed description of one or more embodiments is presented herein by way of exemplification and not limitation.

It has been discovered that a porous fluoropolymer exhibits beneficial and selective fluid flow properties. The porous fluoropolymer is thermally and chemically stable and selectively flows fluid therethrough based in part upon the surface energy of the porous fluoropolymer and the fluid. Moreover, the porous fluoropolymer impedes passage of particulate material that can be entrained in a fluid flow. A method herein for forming the porous fluoropolymer is rapid and efficient. Furthermore, the method produces a porous fluoropolymer with pore size for a given material.

In an embodiment, a method for preparing a porous fluoropolymer precursor includes combining a fluoropolymer and a removable additive to form a composition. The removable additive has a thermal decomposition temperature greater than a sintering temperature of the fluoropolymer. The composition is compressed to form a preform, and the preform is sintered to form the porous fluoropolymer precursor.

As used herein, "a porous fluoropolymer precursor" means a precursor composition or an article made of the precursor composition that is processed to produce a porous fluoropolymer. Although the porous fluoropolymer precursor can have voids, pores of the porous fluoropolymer herein are formed by removal of the removable additive from the porous fluoropolymer precursor.

The fluoropolymer herein exhibits mechanical, thermal, and chemical stability and can be a high fluorine content polymer. In an embodiment, the fluoropolymer is completely fluorinated. In another embodiment, the fluoropolymer is partially fluorinated. In some embodiments, the fluoropolymer is a blend of fluorinated polymers, copolymers, terpolymers, or combinations comprising at least one of the foregoing fluoropolymers. The fluoropolymer also can be an oligomer, a homopolymer, a copolymer, a block copolymer, an alternating block copolymer, a random polymer, a random copolymer, a random block copolymer, a graft copolymer, a star block copolymer, a dendrimer, or the like, or a combination comprising at last one of the foregoing fluoropolymers.

In a fluoropolymer that is a copolymer, the repeat units can be a completely fluorinated, partially fluorinated, or a combination comprising at least one of the foregoing. The repeat units of the fluoropolymer can include vinylidene fluoride units, hexafluoropropylene units (HFP), tetrafluoroethylene units (TFE), chlorotrifluoroethylene (CTFE) units, perfluoro(alkyl vinyl ether) units (PAVE) (e.g., perfluoro(methyl vinyl ether) units (PMVE), perfluoro(ethyl vinyl ether) units (PEVE), and perfluoro(propyl vinyl ether) units (PPVE)), or a combination comprising at least one of the foregoing units.

Exemplary fluoropolymers include polytetrafluoroethylene (PTFE, available under the trade name Teflon from DuPont), polyethylenetetrafluoroethylene (ETFE, available under the trade name Teflon ETFE or Tefzel from DuPont), fluorinated ethylene propylene copolymer (FEP, available under the trade name Teflon FEP from DuPont), perfluoroalkoxy polymer (PFA, available under the trade name Teflon PFA from DuPont), polyvinylidene fluoride (PVDF, available under the trade name Hylar from Solvay Solexis S.p.A.), polyvinylfluoride (PVF, available under the trade name Tedlar from DuPont), polychlorotrifluoroethylene (PCTFE, available under the trade name Kel-F from 3M Corp. or Neoflon from Daikin), polyethylenechlorotrifluoroethylene (ECTFE, available under the trade name Halar ECTFE from Solvay Solexis S.p.A.), chlorotrifluoroethylenevinylidene fluoride (FKM fluorocarbon, available under the trade name Viton from FKM-Industries), perfluoroelastomer such as FFKM (available under the trade name Kalrez from DuPont), tetrafluoroethylene-propylene elastomeric copolymers such as those available under the trade name Aflas from Asahi Glass Co), perfluoropolyether (available under the trade name Krytox from DuPont), perfluorosulfonic acid (available under the trade name Nafion from DuPont), and the like. Other exemplary fluoropolymers include copolymers of vinylidene fluoride and hexafluoropropylene and terpolymers of vinylidene fluoride, hexafluoropropylene, and tetrafluoroethylene.

The fluoropolymer is combined with a removable additive to form the composition. The removable additive is an additive that is removed partially or completely from the fluoropolymer by a removing agent. When removed from the porous fluoropolymer precursor, the removable additive leaves a pore in the fluoropolymer to form the porous fluoropolymer. Moreover, the removable additive is thermally stable above the sintering temperature of the fluoropolymer. According to an embodiment, the removable additive also has a melting temperature greater than the sintering temperature of the fluoropolymer. Thus, the removable additive does not thermally decompose or melt upon sintering of the composition including the fluoropolymer and removable additive when forming the porous fluoropolymer precursor. It is contemplated that materials that melt at or below the sintering temperature of the fluoropolymer can be present in the porous fluoropolymer precursor. Such materials can include an organic acid such sodium benzoate that melts and decomposes at 300° C. In an embodiment, the no such materials that melt at or below the sintering temperature of the fluoropolymer are present in the porous fluoropolymer precursor.

According to an embodiment, the removable additive includes an inorganic salt, glass, or a combination comprising at least one of the foregoing removable additives.

The inorganic salt can be any salt that can be dissolved by water. This includes salts that are readily soluble with water at 25° C. or those sparingly soluble at 25° C. Exemplary inorganic salts include a alkali metal halide (e.g., sodium chloride, potassium chloride, sodium bromide, potassium bromide, and the like), alkaline earth metal halide (e.g., calcium chloride, magnesium chloride, and the like), ammonium halide (e.g., ammonium chloride, ammonium bromide, and the like), alkali metal nitrates (e.g., sodium nitrate, potassium nitrate, and the like), alkaline earth nitrates (e.g., calcium nitrate, magnesium nitrate, and the like), alkali metal carbonate (e.g., sodium carbonate, potassium carbonate, and the like), alkali metal hydrogencarbonate (e.g., sodium hydrogen carbonate, potassium hydrogen carbonate, and the like), alkaline earth metal carbonate (e.g., calcium carbonate, magnesium carbonate, and the like), ammonium carbonate, ammonium hydrogen carbonate, alkali metal phosphate (e.g., trisodium phosphate, tripotassium phosphate, disodium hydrogen phosphate, dipotassium hydrogen phosphate, sodium dihydrogen phosphate, potassium dihydrogen phosphate, and the like), diammonium hydrogen phosphate, ammonium dihydrogen phosphate, and the like. In an embodiment, the inorganic salt is an alkali metal halide such as sodium chloride.

The glass can be a silicon oxide-containing material in a solid, amorphous state without crystallization. Such glass has a high degree of microstructural disorder due to a lack of long-range order. The glass can include an oxide, for example, silicon dioxide ($SiO_2$), aluminum oxide ($Al_2O_3$), barium oxide (BaO), bismuth trioxide ($Bi_2O_3$), boron oxide ($B_2O_3$), calcium oxide (CaO), cesium oxide (CsO), lead oxide (PbO), strontium oxide (SrO), rare earth oxides (e.g., lanthanum oxide ($La_2O_3$), neodymium oxide ($Nd_2O_3$), samarium oxide ($Sm_2O_3$), cerium oxide ($CeO_2$)), and the like.

An exemplary glass is $SiO_2$ (e.g., quartz, cristobalite, tridymite, and the like). The glass can include $SiO_2$ and other components such as elements, for example, aluminum, antimony, arsenic, barium, beryllium, boron, calcium, cerium, cesium, chromium, cobalt, copper, gallium, gold, iron, lanthanum, lead, lithium, magnesium, manganese, molybdenum, neodymium, nickel, niobium, palladium, phosphorus, platinum, potassium, praseodymium, silver, sodium, tantalum, thorium, titanium, vanadium, zinc, zirconium, and the like. The elements can occur in the glass in the form of oxides, carbonates, nitrates, phosphates, sulfates, or halides. Furthermore, the element can be a dopant in the glass. Exemplary doped glass includes borosilicate, borophosphosilicate, phosphosilicate, colored glass, milk glass, lead glass, optical glass, and the like.

In an embodiment, the glass can include non-amorphous, crystalline domains. Such glass can be, for example, a salt or ester of orthosilicic acid or a condensation product thereof, e.g., a silicate. Exemplary silicates are cyclosilicates, inosilicates, mesosilicates, orthosilicates, phyllosilicates, sorosilicates, tectosilicates, and the like. These glasses have a structure based on silicon dioxide or isolated or linked $[SiO_4]^{4-}$ tetrahedral and include other components such as, for example, aluminum, barium, beryllium, calcium, cerium, iron, lithium, magnesium, manganese, oxygen, potassium, scandium, sodium, titanium, yttrium, zirconium, zinc, hydroxyl groups, halides, and the like.

The removable additive can be present in the composition and porous fluoropolymer precursor in an amount from 1 wt. % to 80 wt. %, specifically 5 wt. % to 80 wt. %, and more specifically 5 wt. % to 75 wt. %, based on a weight of the polymer in the composite. The metal disposed on the carbon material can be present in an amount from 0.5 wt. % to 70 wt. %, 0.5 wt. % to 50 wt. %, and more specifically 0.5 wt. % to 30 wt. %, based on the weight of the porous fluoropolymer precursor.

In an embodiment, the removable additive can be any shape and size. The removable additive salt can be crystals or grains of various sizes, and the glass can be pellets, strand, filament, fiber, and the like. Further, the removable additive can be in a powder form.

A size, e.g., a diameter or smallest linear dimension, of the removable additive is from 50 μm to 500 μm, specifically 75 μm to 500 μm, and more specifically 100 μm to 450 μm. The removable additive, e.g., of a fiber, can have an aspect ratio from 1 to 1000, specifically 1 to 100, and more specifically 1 to 10. The removable additive can have a length, or longest linear dimension, from 100 μm to 1 mm, specifically 100 μm to 500 μm, and more specifically 100 μm to 450 μm.

The removable additive has a linear coefficient of thermal expansion effective such that the removable additive does not expand appreciably during sintering the preform. As a result, upon removal of the removable additive from the porous fluoropolymer precursor (described below), a pore in the fluoropolymer formed by removal of the removal additive has a pore size substantially the same as the size of the removable additive before sintering the preform. Thus, the pore size after sintering is from 50 μm to 500 μm, specifically 75 μm to 500 μm, and more specifically 100 μm to 450

µm in the porous fluoropolymer after removal of the removable additive. In an embodiment, the removable additive has a coefficient of linear thermal expansion such that the pore size in the fluoropolymer is within 10% of the size of the removable additive, specifically 5%, and more specifically 2%.

Combining the fluoropolymer and the removable additive to form the composition can include mixing, blending, shaking, stirring and the like. Here, a fluoropolymer can be a powder such that the removable additive is added to the fluoropolymer powder. Since the pore size of a porous fluoropolymer formed from this combination of fluoropolymer and the removable additive is determined, at least in part, by the size of the removable additive, combining the fluoropolymer and the removable additive is contemplated to maintain and not reduce the size of the removable additive. Although some embodiments employ ball mixing, such mixing decreases the size of the removable additive through collisions. For aggressive physical mixing that decreases the size of the removable additive, the removable additive is selected to have an initial size effective to produce a size of the removable additive in the preform (post-mixing the fluoropolymer and the removable additive) from 50 µm to 500 µm, specifically 75 µm to 500 µm, and more specifically 100 µm to 450 µm. According to an embodiment, the fluoropolymer and the removable additive are combined in a rotary mixer, acoustic mixer, and the like to maintain the size of the removable additive during the combining. As a result, combining the fluoropolymer and the removable additive distributes the removable additive in the fluoropolymer such that porous fluoropolymer precursor also will have the removable additive distributed among the fluoropolymer therein. The degree of dispersal of the removable additive in the fluoropolymer can be controlled by the amount of mixing such that the final composition of the fluoropolymer and removable additive has a high, low, or moderate degree of homogenization. In an embodiment, combining the fluoropolymer and the removable additive maintains the size of the removable additive to within 5% of the size of the removable additive before the combining.

After the composition of the fluoropolymer and removable is prepared, the composition can be disposed in a mold. The composition can be subjected to tamping in the mold to settle the composition in the mold so that voids and empty space among the composition and between the composition and mold are removed. Subsequent compression of the composition in the mold forms the preform. Here, the composition can be compressed under a load from 5,000 to 35,000 pounds, specifically 8,000 pounds, to 32,000 pounds, and more specifically 10,000 pounds to 30,000 pounds. The load applied to the composition can be selected based on the effective density of the preform that is desired. Compressing can be performed at room temperature. In some embodiments, compressing the composition occurs at a temperature from 0° C. to 60° C., and specifically 15° C. to 50° C., which can allow some flow of the fluoropolymer to occur. However, this temperature can be inadequate for sintering the fluoropolymer. The compression of the composition forms the preform. The preform thus has the shape of the mold in which it was compressed. As will be appreciated, the mold can be any shape, including cylindrical, polygonal, round, annular, and the like.

After compressing the composition, the preform is demolded from the mold and subjected to sintering. Sintering the preform forms the porous fluoropolymer precursor. The sintering can be performed by placing the preform in a heated environment, for example a programmable oven. The preform is heated to a temperature effective to fuse together the fluoropolymer. A temperature program including temperature ramp, soak, and cooling ramp can be used for sintering. In an embodiment, a powder of fluoropolymer is used in the composition, which is fused during sintering. Sintering the preform can be performed without a mold at a temp from 79° C. (175° F.) to 371° C. (700° F.), specifically 87° C. (190° F.) to 371° C. (700° F.), and more specifically 93° C. (200° F.) to 371° C. (700° F.) for a time and at a pressure effective to fuse the fluoropolymer. As discussed with regard to the removable additive, the removable additive has a melting temperature or thermal decomposition temperature greater than a sintering temperature of the fluoropolymer. In this manner, the preform converts into a porous fluoropolymer precursor that includes the fluoropolymer (that has been fused during sintering) and the removable additive dispersed therein and has substantially the same size as in the composition used to form the preform. The distribution of the removal additive in the porous fluoropolymer precursor can be substantially the same as that in the preform and composition.

The porous fluoropolymer precursor can be cooled (e.g., to room temperature or above) and disposed in a container, e.g., a pressure cooker, bath, sonicator, autoclave, bomb, and the like. In an embodiment, a method for preparing a porous fluoropolymer from the porous fluoropolymer precursor includes disposing the porous fluoropolymer precursor in a removing agent (which also is disposed in the container); contacting the removable additive with the removing agent; and removing, by the removing agent, the removable additive from the porous fluoropolymer precursor to form the porous fluoropolymer. Consequently, the porous fluoropolymer includes a plurality of pores formed by removing the removable additive. Subsequent to forming the pores by removal of the removable additive, the removing agent can flow through the plurality of pores, for example, to effect removal of removable additive.

Removing the removable additive can be performed at a temperature from 60° C. to 90° C., specifically 70° C. to 90° C., and more specifically 70° C. to 80° C. and for a time effective for removal of the removable additive. The time can be selected based on the thickness of the porous fluoropolymer precursor and the extent of removal of the removable additive desired. In an embodiment, the time for removing is from 1 hour to 8 hours, specifically 2 hours to 6 hours, and more specifically 3 hours to 5 hours. The pressure can be any value, including from 1 atmosphere to 5 atmospheres. In this manner, the porous fluoropolymer is formed by removing the removable additive from the porous fluoropolymer, leaving pores among the fluoropolymer.

The removing agent is an agent, for example, a compound or composition that is effective to remove the removable additive from the porous fluoropolymer precursor. The selection of the removing agent determines the ingredients of the removing agent. In an embodiment, the removing agent includes water, which can be effective at elevated temperature for removing salt from the porous fluoropolymer precursor. In an embodiment, a glass that includes a silicon oxide is removed by, for example, etching by the removing agent such as a fluoride component, which can be present with or without an acid. The removing agent also can be, e.g., an acid or base, e.g., an alkaline solution. A removing agent that is acidic can remove $Al_2O_3$ from a glass. Moreover, alkaline earth metal oxides (e.g., MgO, CaO, SrO and BaO) in a glass can be removed by an alkaline removing agent that also can contain a chelating agent, e.g., ethylenediaminetetraacetic acid (EDTA).

In an embodiment, the removing agent includes fluorides, bifluorides, tetrafluoroborates, or a combination thereof. Examples of such a removing agent are, for example, hydrogen fluoride (hydrofluoric acid); ammonium, alkali metal, and antimony fluorides; ammonium, alkali metal, and calcium bifluorides; alkylated ammonium and potassium tetrafluoroborates; or a combination comprising at least one of the foregoing removing agents. Exemplary removing agents that include fluoride are hydrogen fluoride, ammonium fluoride, fluoroborates, fluoroboric acid, tin bifluoride, antimony fluoride, tetrabutylammonium tetrafluoroborate, and aluminum hexafluoride. In an embodiment, the removing agent is water. In some embodiments, the removing agent is hydrogen fluoride, ammonium fluoride, or a combination thereof. A mineral acid such as hydrogen chloride can be added, which can increase the rate of removal of the removable agent.

The removing agent is effective in removing the removable additive from the porous fluorocarbon precursor at a temperature from 15° C. to 100° C., specifically 50° C. to 90° C., and more specifically 70° C. to 90° C. In an embodiment, the removing agent can be activated by input of energy, for example, thermal radiation emitted by infrared emitters (e.g., up to about 300° C.), ultraviolet radiation, sonic wavelengths, ultrasonic wavelengths, laser radiation, or a combination thereof.

A solvent can be used with the removing agent. The solvent can be present in an amount from 0 wt. % to 90 wt. %, specifically 0 wt. % to 50 wt. %, and more specifically 0 wt. % to 20 wt. %, based on the weight of the removing agent. Suitable solvents may be an inorganic solvent, organic solvent, or a combination thereof. Exemplary solvents include water, alcohols (e.g., methanol, ethanol, and the like), polyhydric alcohols (e.g., diethylene glycol, dipropylene glycol, 1,2-propanediol, 1,4-butanediol, 1,3-butanediol, glycerol, 1,5-pentanediol, 2-ethyl-1-hexanol, and the like), ketones (e.g., acetophenone, methyl-2-hexanone, and the like), ethers (e.g., ethylene glycol monobutyl ether, triethylene glycol monomethyl ether, and the like), carboxylic acid esters (e.g., [2,2-butoxy(ethoxy)]ethyl acetate and the like), esters of carbonic acid (e.g., propylene carbonate and the like), inorganic acids (e.g., hydrofluoric acid, hydrochloric acid, phosphoric acid, sulfuric acid, nitric acid, and the like), organic acids (e.g., those having an C1-C10 alkyl chain, which is a straight or branched chain and can be substituted)), or a combination thereof. Examples of the solvent include organic carboxylic acids, hydroxy-carboxylic acids, and dicarboxylic acids, such as formic acid, acetic acid, lactic acid, oxalic acid, and the like.

Using the removing agent therefore removes the removable additive from the porous fluoropolymer precursor to provide the pores in the porous fluoropolymer. The pores have a size determined by the size of the removable additive and can be from 50 µm to 500 µm, specifically 75 µm to 500 µm, and more specifically 100 µm to 450 µm. A portion of the pores can be connected and establish a variety of paths through the porous fluoropolymer. Although an embodiment includes some fluid flow paths via the pores through the porous fluoropolymer, some embodiments have fluid flow paths through the pores that are tortuous. As a result, the porous fluoropolymer can prohibit, prevent, limit, restrict, impede, or otherwise reduce fluid flow therethrough for providing a pressure drop thereacross. As used herein, "tortuous" is intended to mean that the flow path is circuitous, winding, twisting, meandering, labyrinthine, helical, spiraling, crooked, or otherwise indirect.

The porous fluoropolymer herein has advantageous material properties. The porous fluoropolymer has excellent solvent resistance, electrical insulating properties, low coefficient of friction, a low flammability, selective permeability based on size or surface energy of an agent for transmission through the porous fluoropolymer, and high inertness and stability. Moreover, the porous fluoropolymer can be further processed by machining techniques to fabricate the porous fluoropolymer into various shaped articles. Machining techniques include drilling, milling, lathing, lapping, cutting, and the like. Further, the porous fluoropolymer has a high melting temperature such that the porous fluoropolymer advantageously can be used over a wide temperature range, for example, from less than 0° C. to 450° C. In an embodiment, the porous fluoropolymer has a thermal decomposition temperature greater than 200° C., specifically greater than 300° C., and more specifically greater than 370° C.

The porous fluoropolymer described herein has many uses. In an embodiment, the porous fluoropolymer is an article. The article can be, for example, a filter, membrane, tubular, sand screen, motor cover, mesh, cover, sheet, or a combination comprising at least one of the foregoing.

Such an article can control the flow of a fluid. As used herein, the term "fluid" includes a liquid, gas, hydrocarbon, multi-phase fluid, mixture of two of more fluids, water, and a fluid injected from the surface of the earth downhole (as in hydrocarbon production and the like) such as water. References to water should be construed also to include water-based fluids, e.g., brine or salt water. Subsurface formations typically contain water, brine, or other undesirable fluids along with oil or other desirable fluids. Herein, within the context of hydrocarbon production, "water" may be used generally to represent any undesirable fluid, while "oil" may generally be used to represent any desirable fluid, although other fluids may be desirable or undesirable in other embodiments.

In one embodiment, the porous fluoropolymer and article thereof are low surface energy materials. As used herein, "low surface energy" is intended to mean having a surface energy less than about the lowest surface energy component of a fluid that contacts the article. For example, in an embodiment of an oil/water mixture, the article has a surface energy less than that of oil. Since the surface energy of oil is much less than that of water, oil more readily wets a low surface energy material, while water molecules form droplets or beads at the surface of a low surface energy material such as the porous fluoropolymer of the article. The fluoropolymers and thus pours fluoropolymer herein, e.g., made of PTFE, have surface energies less than that of oil, i.e., less than approximately 25 or 30 milliNewtons per meter (mN/m). Due to the surface energy of the article, the article can be configured such that a fluid having a surface energy less than 40 milliNewtons per meter (mN/m) at 25° C. has a higher flow rate through the pores of the porous fluoropolymer in the article than a fluid having a surface energy greater than 40 mN/m at 25° C. In another embodiment, the article is configured to preferentially flow, through the plurality of pores of the porous fluoropolymer, a low surface energy fluid (e.g., oil, hydrophobic compound, aliphatic compound), and preferentially impede flow of a fluid having a high surface energy (e.g., greater than 40 mN/m), such as water. In yet another embodiment, the article is configured to impede the transmission of particles having a diameter greater than the size of the pores of the porous fluoropolymer, or less than up to 50% the size of the pores due to the tortuous flow paths in the porous fluoropolymer.

The article can be arranged in a variety of ways, e.g., an annular cylinder (a hollow cylinder) comprising the porous fluoropolymer, rod, block, sphere, or any other desired form depending on the shape and configuration of the flow path in which the article is installed. The shape of the article is determined by the mold that is used to make the preform.

The articles and methods are further illustrated by the following non-limiting example.

Preparation Of The Porous Fluoropolymer Precursor. Potassium chloride and polytetrafluoroethylene powder were weighed on a balance respectively to provide 92 g each of the fluoropolymer and salt. The potassium chloride and polytetrafluoroethylene were transferred to a glass bottle and mixed in a Resodyn acoustic mixer at 70% intensity for one minute on an auto frequency setting. The resultant mixture was placed in a mold, which was shook to consolidate the mixture. A total of 920 g of PTFE and KCl mixture was added to the mold in five equal portions to make a 4" long PTFE core. The mixture was compressed in the mold using a piston at a limiting force of 15,000 psi with a crosshead travel speed of 4 inches per minute. The preform, which was a cylinder, was removed from the mold using a hydraulic press and subsequently sintered in a programmable convention oven. For sintering the preform and making the porous fluoropolymer precursor, the temperature program of the convection oven was as follows: (a) heat to 580° F. with a ramp rate of 10° F./minute, (b) hold at 580° F. for 2 hours, (c) heat to 700° F. with a ramp rate of 10° F./min, (d) hold at 700° F. for 3 hours, (e) cool to 550° F. with a ramp rate of 1° F./minute, (g) hold at 550° F. for 2 hours, (h) cool to 180° F. with a ramp rate of 5° F./minute, (i) hold at 180° F. for 3 hours, and (j) cool to room temperature.

Preparation of the Porous Fluoropolymer. The porous fluoropolymer precursor was weighed, and the size was measured to determine its initial weight and dimensions (height and outer diameter). The porous fluoropolymer precursor was disposed in a pressure cooker that was half-filled with water and heated on a heating plate for 3 to 4 hours. The maximum temperature in the pressure cooker was 100° C. (212° F.). After the heating time, the resulting salt water was drained from the pressure cooker, and the porous polytetrafluoroethylene cylinder was washed with copious amount of water followed by washing with isopropyl alcohol. The porous polytetrafluoroethylene cylinder was then dried in a vacuum oven held at 100° C. (212° F.) for 2 hours, cooled, weighed, and measured for physical dimensions of height and outer diameter.

The percent porosity was calculated using the following equation: % porosity=(initial weight−final weight)/initial weight*100%. The porous polytetrafluoroethylene cylinder had a percent porosity of 57%.

Figure 2:
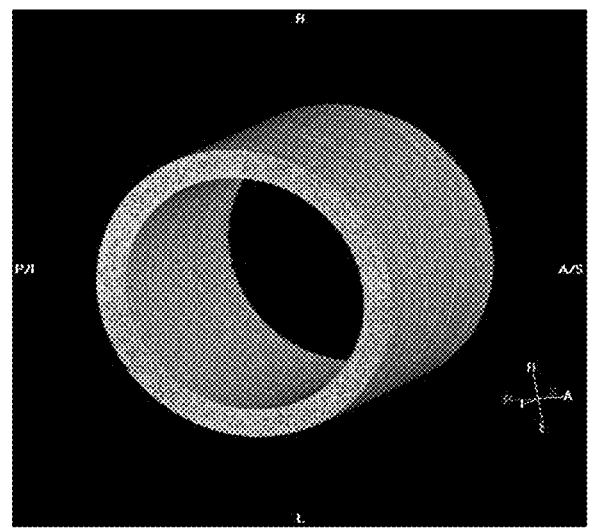
FIG. 2 shows a 3D image from a computed tomography (CT) scan of the porous polytetrafluoroethylene cylinder of FIG. 1.

FIG. 1 shows a picture of the porous polytetrafluoroethylene cylinder, and FIG. 2 shows a 3D image from a computed tomography (CT) scan of the porous polytetrafluoroethylene cylinder.

Figure 3:
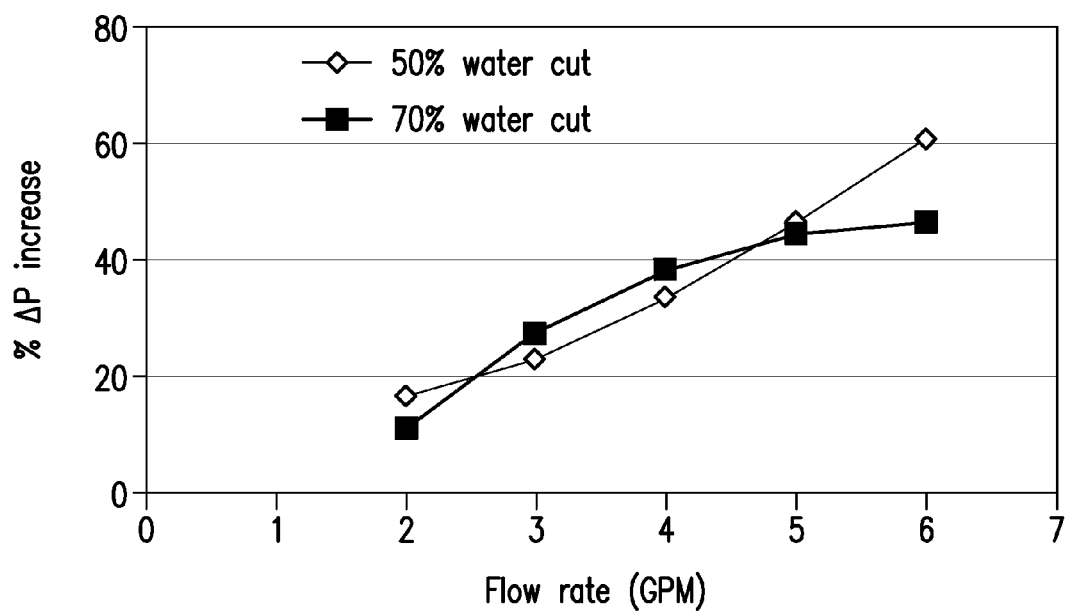
FIG. 3 shows a graph of percentage pressure increase versus flow rate for samples of oil and water across a cylinder of a porous fluoropolymer formed from a porous fluoropolymer precursor.

Flow Test. The porous tetrafluoroethylene cylinder was flow tested by flowing a sample of oil and water having the following compositions: 0 wt. % water (pure oil), 50 wt. % water, and 70 wt. % water, based on the total weight of the oil and water sample. The flow rate of each sample of water and oil was determined using a flow ramp having from 2-6 gallons per minute (gpm) with data acquired at 1 gpm increments. The flow ramps of each sample were repeated three times to verify repeatability and reliability of the flow data of the porous tetrafluoroethylene cylinder. The percentage pressure increase (% ΔP) of each sample relative to pure oil (i.e., 0% water) across the porous tetrafluoroethylene cylinder is plotted in the FIG. 3.

While one or more embodiments have been shown and described, modifications and substitutions may be made thereto without departing from the spirit and scope of the invention. Accordingly, it is to be understood that the present invention has been described by way of illustrations and not limitation. Embodiments herein are can be used independently or can be combined.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant (s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." It should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive; rather the elements can be used separately or can be combined together under appropriate circumstances.

What is claimed is:

1. A method for preparing a porous article, the method comprising:
  combining a fluoropolymer and a removable additive to form a powder composition, the removable additive having a thermal decomposition temperature greater than a sintering temperature of the fluoropolymer; the removable additive comprising an inorganic salt, glass, or a combination comprising at least one of the foregoing removable additives; the inorganic salt comprising an alkali metal halide, alkali metal nitrates, alkali metal carbonate, alkali metal hydrogencarbonate, alkali metal phosphate, or a combination comprising at least one of the foregoing inorganic salts;
  compressing the powder composition at room temperature to form a compressed composition;
  sintering the compressed composition at atmospheric pressure to form a preform;
  disposing the preform in a removing agent; the preform consisting essentially of the fluoropolymer and the removable additive;
  contacting the removable additive with the removing agent; and
  removing, by the removing agent, the removable additive from the preform to form the porous article,
  the porous article comprising a plurality of pores formed by removing the removable additive, a portion of the pores being connected and establishing fluid flow paths through the article;

wherein the fluoropolymer is selected such that the article has a surface energy less than about 30 milliNewtons per meter; and the article is configured such that a fluid having a surface energy less than 40 milliNewtons per meter at 25° C. has a higher flow rate through the pores of the article than a fluid having a surface energy greater than 40 mN/m at 25° C.

2. The method of claim 1, further comprising:
disposing the powder composition in a mold prior to compressing the powder composition; and
removing the compressed composition from the mold before sintering the compressed composition.

3. The method of claim 1, wherein combining the fluoropolymer and the removable additive distributes the removable additive in the fluoropolymer, and the compressed composition has the removable additive distributed among the fluoropolymer.

4. The method of claim 1, wherein sintering the compressed composition is performed at a temperature from 79° C. (175° F.) to 371° C. (700° F.).

5. The method of claim 1, wherein the fluoropolymer is partially fluorinated.

6. The method of claim 1, wherein the fluoropolymer is completely fluorinated.

7. The method of claim 1, wherein the fluoropolymer comprises polytetrafluoroethylene, polyethylenetetrafluoroethylene, fluorinated ethylene propylene copolymer, perfluoroalkoxy polymer, polyvinylidene fluoride, polyvinylfluoride, polychlorotrifluoroethylene, polyethylenechlorotrifluoroethylene, chlorotrifluoroethylenevinylidene fluoride, perfluoroelastomer, tetrafluoroethylene-propylene elastomeric copolymer, perfluoropolyether, perfluorosulfonic acid, or a combination comprising at least one of the foregoing fluoropolymers.

8. The method of claim 1, wherein the removable additive is the glass which comprises silicon dioxide, aluminum oxide, barium oxide, bismuth trioxide, boron oxide, calcium oxide, cesium oxide, lead oxide, strontium oxide, a rare earth oxide, lanthanum oxide, neodymium oxide, samarium oxide, cerium oxide, or a combination comprising at least one of the foregoing glasses.

9. The method of claim 1, wherein the removable additive is present in the porous fluoropolymer precursor in an amount from 1 wt. % to 80 wt. %, based on the weight of the porous fluoropolymer precursor.

10. The method of claim 1, wherein a size of the removable additive is from 50 μm to 500 μm.

11. The method of claim 1, wherein the melting temperature of the removable additive is greater than the sintering temperature.

12. The method of claim 1, further comprising flowing the removing agent through the plurality of pores.

13. The method of claim 1, wherein removing the removable additive is performed at a temperature from 60° C. to 90° C.

14. The method of claim 1, wherein the removing agent comprises water, hydrogen fluoride, ammonium fluoride, alkali metal fluoride, antimony fluoride, ammonium bifluoride, alkali metal bifluoride, calcium bifluoride, alkylated ammonium tetrafluoroborate, potassium tetrafluoroborate, fluoroboric acid, tin bifluoride, tetrabutylammonium tetrafluoroborate, aluminum hexafluoride, or a combination comprising at least one of the foregoing removing agents.

15. The method of claim 1, wherein a size of the plurality of pores is from 50 μm to 500 μm.

16. The method of claim 1, wherein the article comprises a flow control device, filter, membrane, tubular, sand screen, motor cover, mesh, cover, sheet, or a combination comprising at least one of the foregoing.

* * * * *